United States Patent [19]

Herman et al.

[11] Patent Number: 5,472,463
[45] Date of Patent: Dec. 5, 1995

[54] PRESSURE SIDE INTEGRATED AIR FILTER AND FILTERING NETWORKS FOR ENGINES

[75] Inventors: Peter K. Herman, Cookeville, Tenn.;
Roger L. Clark, Columbus, Ind.;
Harry L. Maxwell, Cookeville, Tenn.;
Steven J. Reilly, Westlake, Ohio

[73] Assignee: Cummins Engine Company, Inc., Columbus, Ind.

[21] Appl. No.: 259,633

[22] Filed: Jun. 14, 1994

[51] Int. Cl.$^6$ .................................................. B01D 46/10
[52] U.S. Cl. ............................. 55/319; 55/322; 55/328; 55/332; 55/337; 55/340; 55/348; 55/385.3; 55/493; 55/497; 55/502; 55/504; 123/198 E
[58] Field of Search ..................... 55/218, 318–321, 55/324, 328, 332, 337, 338, 340, 348, 385.3, 493, 497, 498, 502–505, 508, 521; 123/198 E, 563

[56] References Cited

U.S. PATENT DOCUMENTS

| | | | |
|---|---|---|---|
| 2,963,009 | 12/1960 | Dolza | 123/198 E X |
| 3,241,537 | 3/1966 | Jones | 55/320 X |
| 3,521,431 | 7/1970 | Connors et al. | 55/318 X |
| 3,614,862 | 10/1971 | Connors | 55/321 |
| 3,641,744 | 2/1972 | Culbert et al. | 55/319 |
| 3,676,024 | 7/1972 | Akaiki et al. | 55/320 X |
| 3,695,012 | 10/1972 | Rolland | 55/337 X |
| 3,884,658 | 5/1975 | Roach | 55/315 |
| 3,915,679 | 10/1975 | Roach et al. | 55/348 X |
| 4,028,076 | 6/1977 | Fields | 55/337 X |
| 4,065,341 | 12/1977 | Cub | 55/498 X |
| 4,122,820 | 10/1978 | Ryberg | 123/198 E |
| 4,204,848 | 5/1980 | Schulmeister et al. | 55/269 |
| 4,300,511 | 11/1981 | Lang | 123/198 E X |
| 4,347,068 | 8/1982 | Cooper | 55/319 |
| 4,373,940 | 2/1983 | Petersen | 55/328 |
| 4,416,675 | 11/1983 | Montierth | 55/502 |
| 4,482,365 | 11/1984 | Roach | 55/218 |
| 4,602,595 | 7/1986 | Aoki et al. | 55/385,3 X |
| 4,673,503 | 6/1987 | Fujimoto | 210/493.1 |
| 4,702,756 | 10/1987 | Yajima | 55/473 |
| 4,767,425 | 8/1988 | Camplin et al. | 55/337 X |
| 4,810,269 | 3/1989 | Stackhouse et al. | 55/319 X |
| 5,125,940 | 6/1992 | Stanhope et al. | 55/385.3 |
| 5,213,596 | 5/1993 | Kume et al. | 55/493 X |

FOREIGN PATENT DOCUMENTS

| | | | |
|---|---|---|---|
| 0558091 | 9/1993 | European Pat. Off. | 55/337 |
| 1150474 | 1/1958 | France | 55/337 |

*Primary Examiner*—Robert Spitzer
*Attorney, Agent, or Firm*—Woodard, Emhardt, Naughton, Moriarty & McNett

[57] ABSTRACT

A pressure side integrated air filter assembly for a turbocharged engine includes an air filter carrier which is designed and arranged to receive an air filter element and which is adapted to mount to the intake manifold of the turbocharged engine. The air filter carrier which receives an air filtering element is disposed within the intake manifold and the intake manifold cover serves as the air filter cover. A peripheral flange on the air filter carrier is used to support the air filter assembly by being clamped between the intake manifold cover and the intake manifold. This peripheral flange substitutes for the intake manifold gasket. The air filter carrier and the air filter element each have a trapezoidal shape in cross section as a way to conserve space within the intake manifold. The air filter element is a single panel of filtering media which is fan-folded with a first series of folds disposed adjacent the intake manifold cover and an alternating second series of folds disposed at the outlet side of the air filter carrier. The integrated air filter assembly is mounted within the intake manifold and may be used as a security filter with a cannister filter positioned upstream from the turbocharger or with a precleaner air filter disposed upstream from the turbocharger.

18 Claims, 17 Drawing Sheets

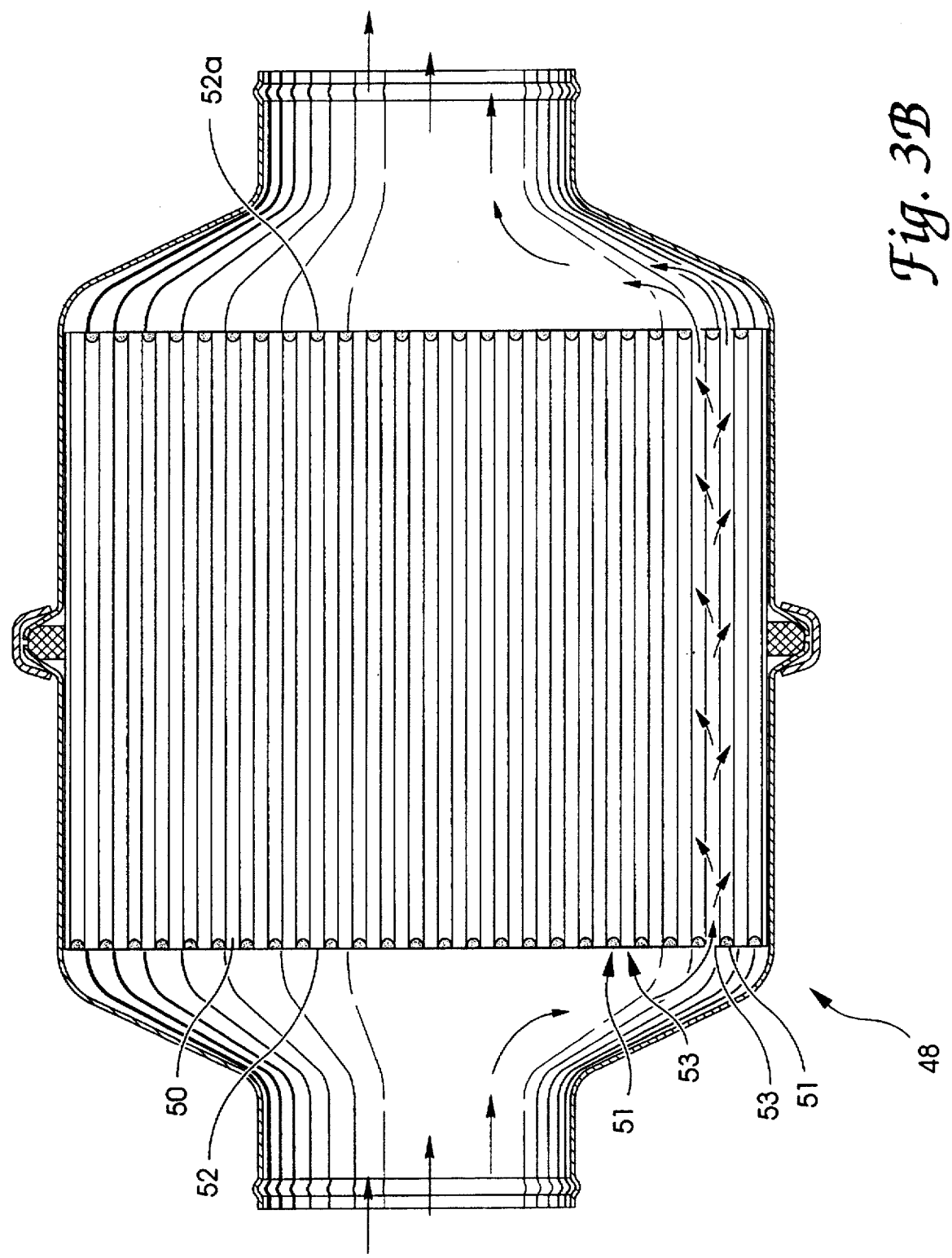

PRESSURE SIDE INTEGRATED AIR FILTER AND FILTERING NETWORKS FOR ENGINES

BACKGROUND OF THE INVENTION

The present invention relates in general to vehicle air filters and to the overall theory of air filtration for an internal combustion engine. More specifically the present invention relates to high-efficiency air filters, air filters which are incorporated into the engine block and the use of a combination of filters in a filtering network to provide cleaner intake air to the engine.

Traditionally, automotive air filters have been designed as separate, add-on components to the engine air intake system. One result or this design philosophy has been the evolution of cannister-type air filters. However, these air filters are bulky and must be utilized in combination with external connecting conduits involving several assembly steps as well as several components. The outcome is typically an air filter installation which is prone to leakage. Another potential problem is that these bulky, cannister filters may admit dust to the engine when the air intake system is being service. A still further potential problem for the manufacturer of the air filter is the integrity of the installation which will be performed by the purchaser—OEM. Since system responsibility rests with the OEM, the quality of each installation can vary and there is no fixed or standard quality level.

The present invention addresses these concerns in a number of ways by the filter designs and filter system arrangements which are disclosed and described herein. The present invention provides a high-efficiency precleaner filter which may be arranged in alternative forms. Also included as part of the present invention is a barrier filter which is incorporated directly into the engine block (intake manifold) in order to trap any remaining dust which is not trapped by whatever filter arrangement may be installed upstream from the engine block. This integrated filter also helps to protect the engine from dust in any original or replacement air intake plumbing or components.

Part of the theory embodied in the present invention as it relates to diesel engines can be explained in the following manner. Since diesel engines are turbocharged, the air on the pressure side of the turbocharger has a greater density, and thus a smaller filter can be used to achieve the same dust-holding capacity. It is a well established fact that reducing the "face velocity" of flow through a given area of filtering medium allows a higher dust holding capacity to be realized. The increased air density in effect reduces the velocity of flow through the medium and provides that benefit. Secondly, since the thermodynamic "work" associated with pumping a gas volume (assumed incompressible) across a restriction is equal to the volume times the restriction, then the maximum allowable restriction (termination restriction level) for a pressure side integrated air filter is larger since the volume of gas is smaller due to increased density. Specifically, assuming equal air temperatures, for equal "work" and hence engine performance, the termination restriction for a pressure side integrated air filter is equal to the conventional "upstream of turbo" termination restriction level (usually 25 in $H_2O$ for turbo diesels) multiplied by the turbo boost ratio (usually around 2.5 for turbo diesels). Simply put, a filter on the pressure side of the turbocharger can be "plugged" to a higher degree since the pumping energy remains lower due to the lower volume flow. Consequently, a filter placed downstream of a turbocharger can hold more dust than a naturally-aspirated filter with the same pressure drop. Combining with filter with a suitable precleaner will significantly lengthen the service interval for the engine. Another advantage of an integrated filter system, such as that disclosed herein, is that it allows the engine manufacturer to carefully control the air filtration quality and this is expected to reduce warranty claims directed to dust which is ingested by the engine during servicing.

The integrated air filter which is housed in the engine block (intake manifold) requires very little space due to its geometry and does not require any housing. When this integrated air filter is used as a primary air filter, an upstream, inertial precleaner (or similar precleaner) is needed to protect the turbocharger. However, this integrated air filter could simply be used as a safety filter without regard to what type of upstream filtration system is in place. In this approach, this "safety" filter would provide advantages to the end-user in terms of fail-safe engine protection.

Improvement efforts for air filters and air filtration systems have been ongoing for a number of years. Some of these efforts have resulted in issued United States patents. A representative sample of such patents is listed below and while each may possess certain elements of novelty, as its time of issue, none are believed to be particularly close to the teachings of the present invention:

| U.S. Pat. No. | Patentee | Issue Date |
| --- | --- | --- |
| 3,884,658 | Roach | May 20, 1975 |
| 4,204,848 | Schulmeister et al. | May 27, 1980 |
| 4,347,068 | Cooper | Aug. 31, 1982 |
| 4,373,940 | Petersen | Feb. 15, 1983 |
| 4,482,365 | Roach | Nov. 13, 1984 |
| 4,673,503 | Fujimoto | Jun. 16, 1987 |
| 4,702,756 | Yajima | Oct. 27, 1987 |
| 5,125,940 | Stanhope et al. | Jun. 30, 1992 |

SUMMARY OF THE INVENTION

A pressure side integrated air filter assembly for a turbocharged engine which includes an intake manifold according to one embodiment of the present invention comprises an air filter carrier designed and arranged to mount to the intake manifold, a portion of the air filter carrier being disposed within the intake manifold and the air filter carrier including an exit aperture for the exit flow of filtered air, an air filter element having an inlet side and an outlet side and being loaded into the air filter carrier and positioned across the exit aperture and an air filter cover designed and arranged to mount to the intake manifold over the air filter element, the air filter cover having an air inlet aperture to introduce air into the air filter element.

According to another embodiment of the present invention a filtering network is disclosed in combination with a turbocharged internal combustion engine. The engine includes a turbocharger and an intake manifold which is disposed in air flow communication with the turbocharger. The air filter network includes a precleaner air filter positioned upstream from the turbocharger and a pressure side air filter assembly disposed within the intake manifold and enclosed by an intake manifold cover.

One subject of the present invention is to provide an improved pressure side integrated air filter assembly.

Another object of the present invention is to provide an improved air filter network for a turbocharged internal combustion engine.

Related objects and advantages of the present invention will be apparent from the following description.

BRIEF DESCRIPTION OF THE DRAWINGS

FIG. 3B is a diagrammatic illustration of the in-line air filter of the FIG. 3 system detailing the air flow path.

DESCRIPTION OF THE PREFERRED EMBODIMENT

Figure 1:
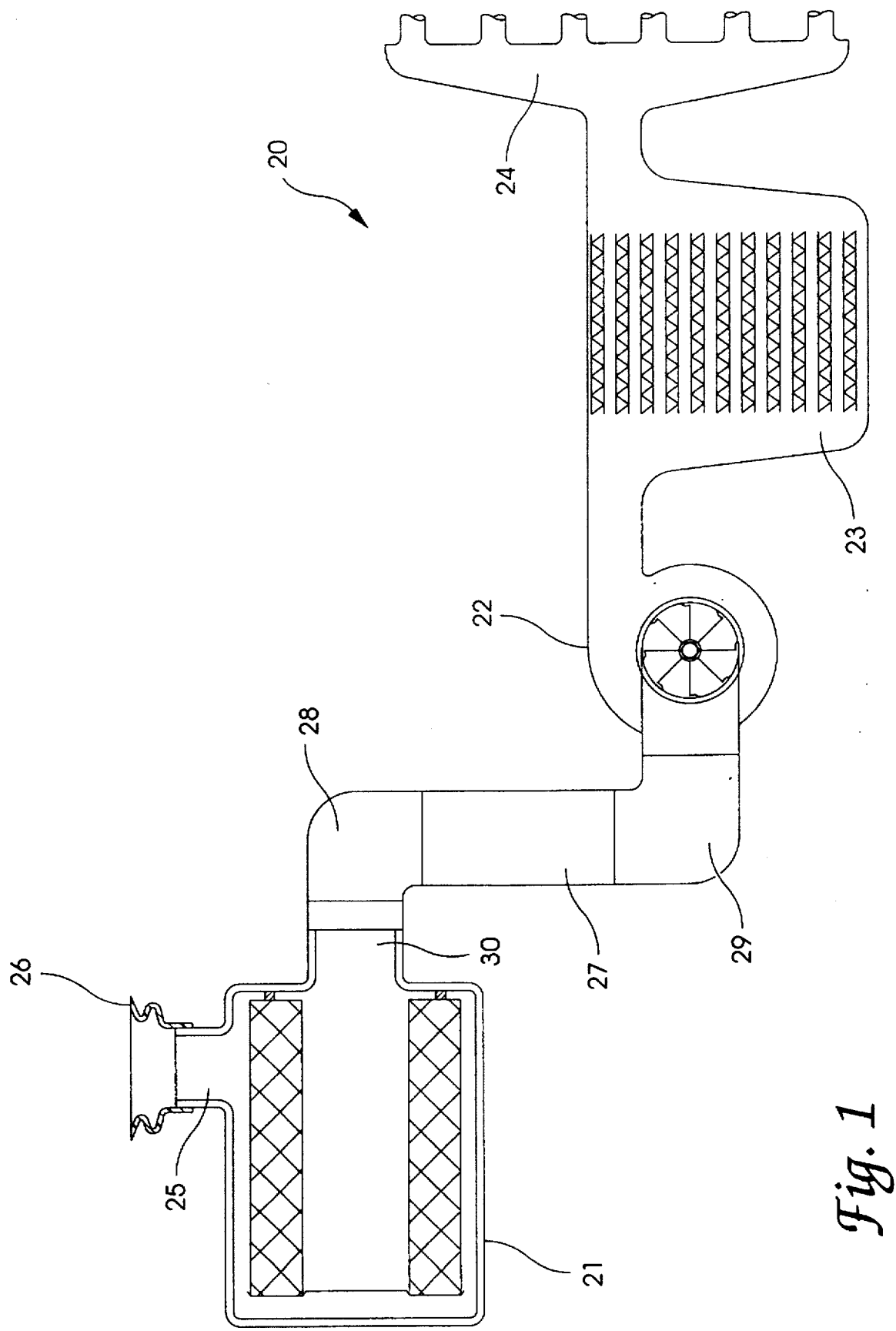
FIG. 1 is a diagrammatic illustration of a conventional engine air intake system which provides a starting point for discussion of the present invention.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring to FIG. 1 there is illustrated a conventional engine air intake system 20 which represents the starting point for a discussion and explanation of the present invention. System 20 includes a conventional cannister air filter 21, turbocharger 22, charge air cooler 23 and intake manifold 24. Filter inlet 25 is connected to rubber bellows 26 which in turn seals to the hood inlet (not illustrated). Conduit 27 and elbows 28 and 29 form the connection and air flow path from filter outlet 30 to the turbocharger 22. The incoming air to filter 21 has a density which is approximately 0.075 lb/ft$^3$ (0.0047 Kg/m$^3$). The maximum restriction at the outlet 30 is 25 inches of water and the charge air entering the intake manifold has a density which is approximately 0.177 lb/ft$^3$ (0.011 Kg/m$^3$). As discussed, there may be some concern over sealing of the connections from the air filter 21 to the turbocharger 22. The two elbows 28 and 29 each create two locations where sealing is critical. These four locations include the connection interfaces between outlet 30 and elbow 28, elbow 28 and conduit 27, conduit 27 and elbow 29 and elbow 29 and turbocharger 22.

Figure 2:
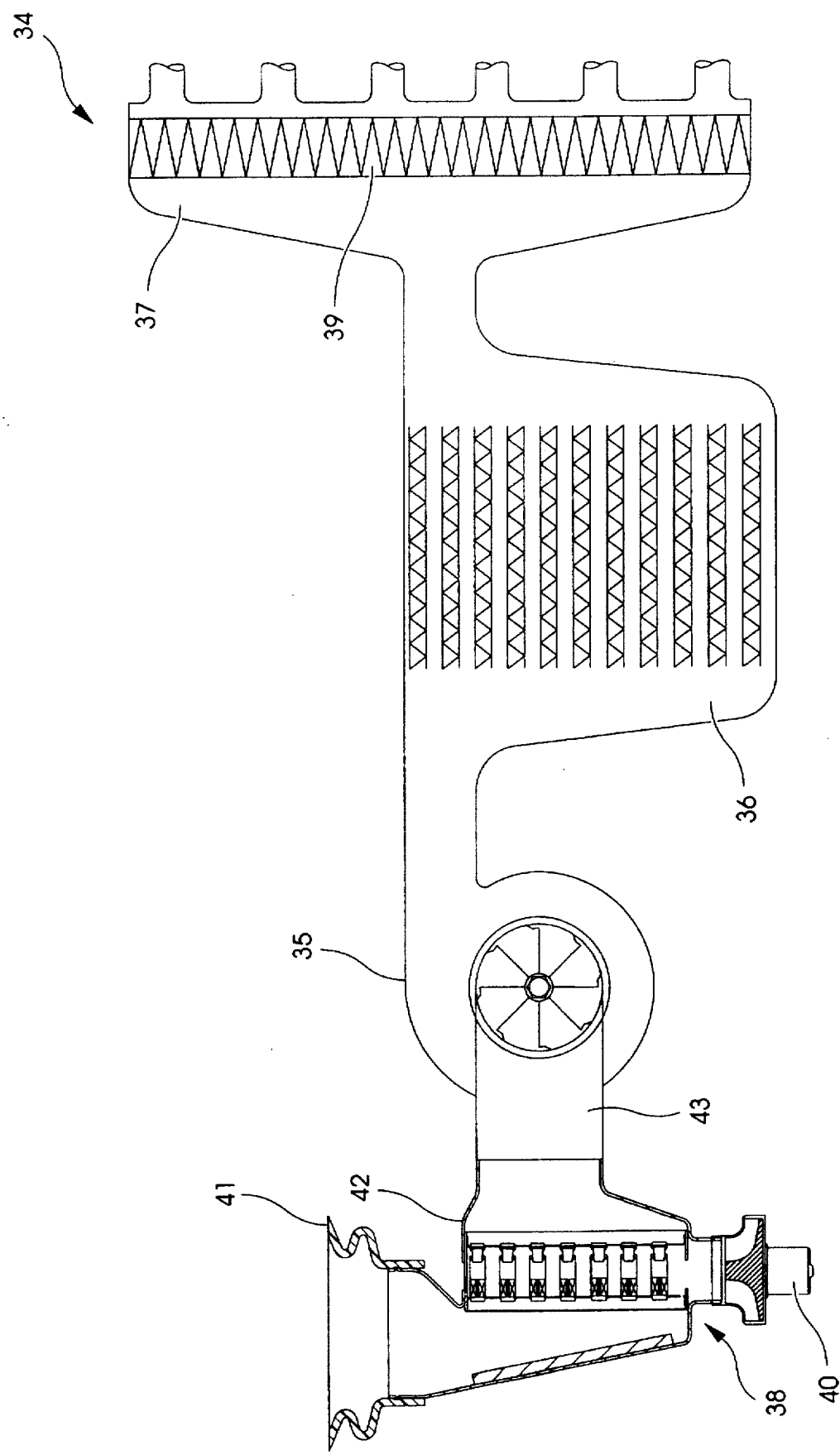
FIG. 2 is a diagrammatic illustration of a pressure side integrated air filter system according to the present invention.
Figure 5:
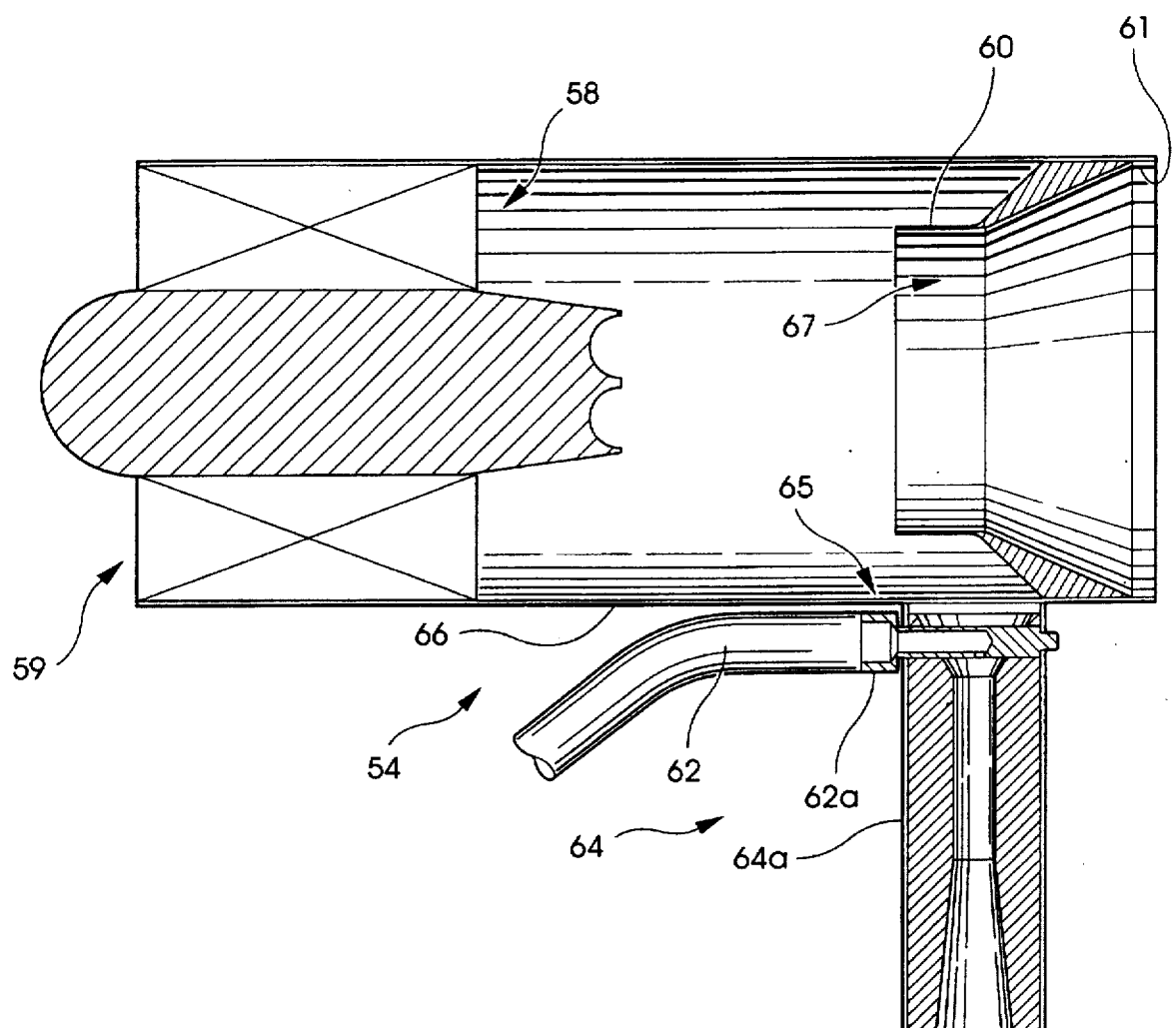
FIG. 5 is a side elevational view in full section of a pressure ejector nozzle and venturi which comprises one portion of the FIG. 4 system.

Referring now to FIG. 2 there is illustrated a pressure side, integrated air filter system 34 according to one embodiment of the present invention. System 34 is similar in some respects to system 20 in that there is still a turbocharger 35, charge air cooler 36 and intake manifold 37. However, any truly substantive similarities end here. The differences include replacement of air filter 21 with precleaner 38 and integrating an air filter 39 into the intake manifold. Precleaner 38 may be arranged with an electrical scavenger blower 40 which is the embodiment illustrated in FIG. 2 or with a sealed dust bin (see FIGS. 13 and 13A), or with a pressure driven ejector as illustrated in FIG. 5.

System 34 includes bellows 41 and an outer sleeve 42 as part of precleaner 38 which connects to the air intake duct 43 of turbocharger 35 for directly to the turbocharger. The density of the incoming air is not changed and the charge air density entering the intake manifold remains 0.177 lb/ft$^3$ (0.11 Kg/m$^3$). A more detailed explanation of the structure and operation of a precleaner such as precleaner 38 will be provided hereinafter in connection with the discussion of FIGS. 12 and 12A. Additionally, there is an alternative style of precleaner illustrated in FIGS. 13 and 13A and that will also be discussed as there are several options for the specific design and style of a precleaner as part of the filtering system according to the present invention. A more detailed explanation of the structure and operation of the pressure side integrated air filter 39 will also be provided hereinafter.

Figure 3:
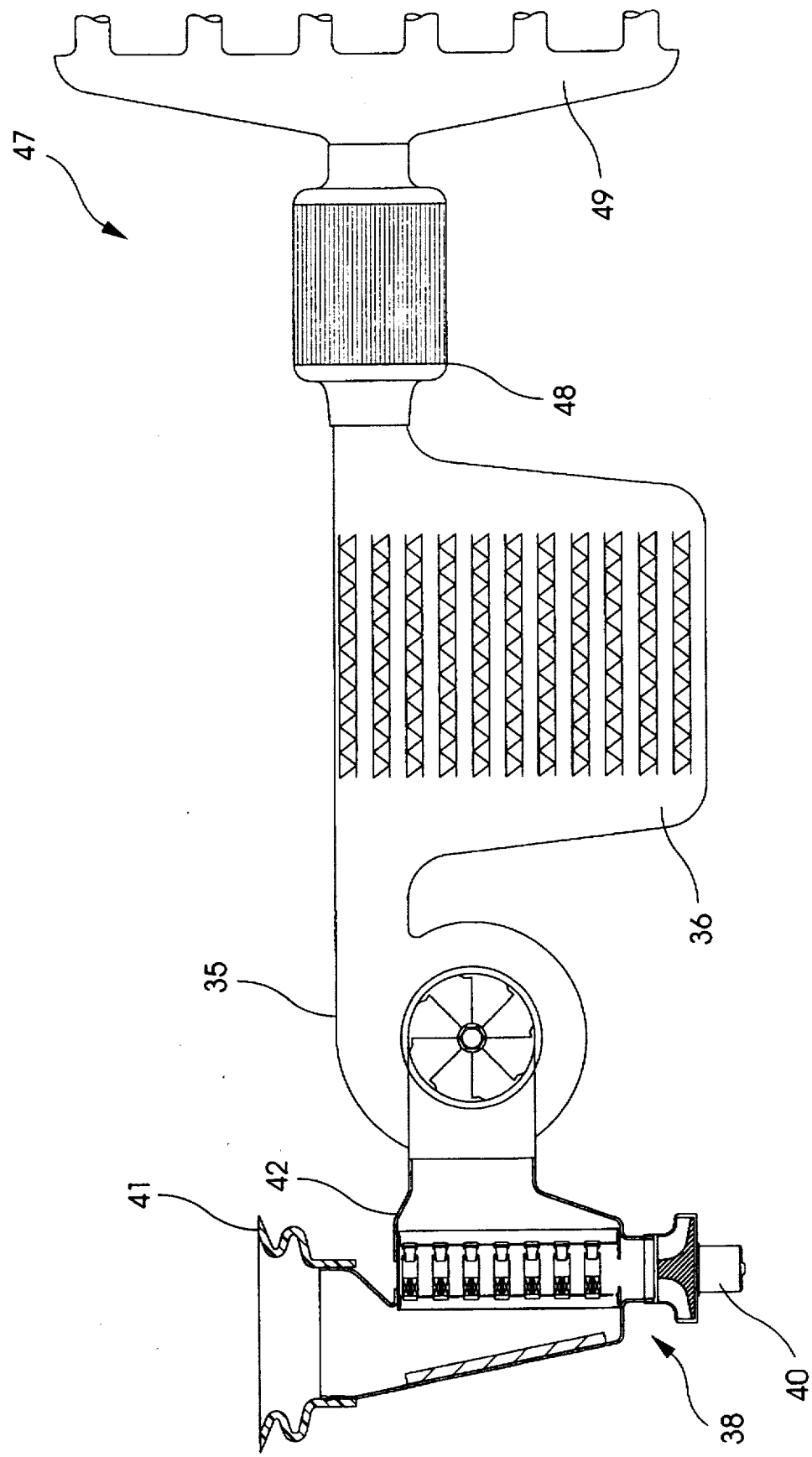
FIG. 3 is a diagrammatic illustration of a pressure side, in-line air filter system according to another embodiment of the present invention.

Referring to FIG. 3 there is illustrated a pressure side, in-line air filter system 47 according to one embodiment of the present invention. System 47 is virtually identical to the present invention illustrated in FIG. 2 except that the integrated air filter 39 (of FIG. 2) has been removed from within the intake manifold 49 and replaced by in-line filter 48. In those situations where pressure side filtering and/or safety filtering is designed, but where an integrated filter (installed into the intake manifold) is not desired, system 47 may be used.

Figure 3A:
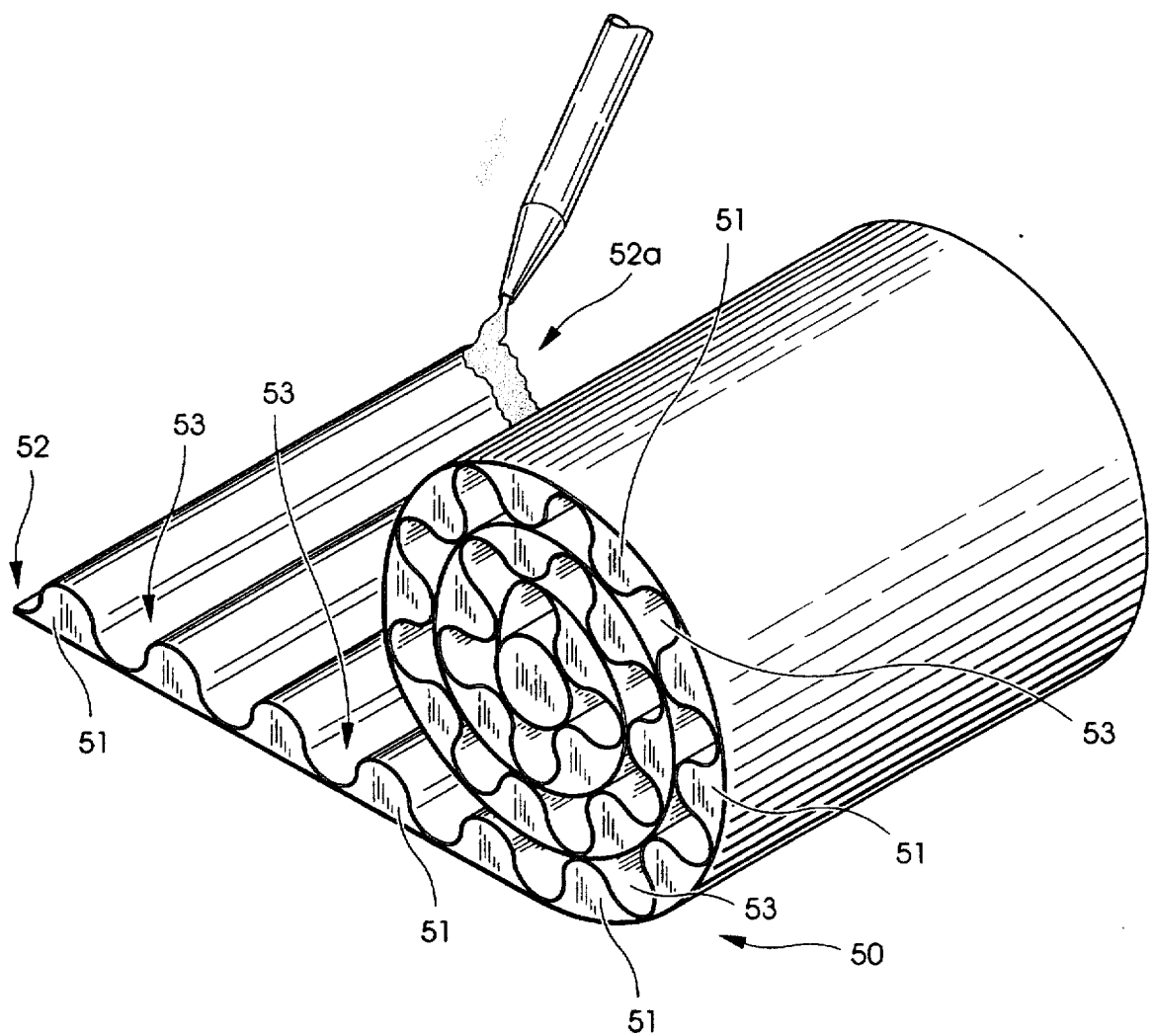
FIG. 3A is a diagrammatic illustration of the corrugated filtering medium used in the in-line air filter of the FIG. 3 system.

The pressure side in-line filter 48 is designed using a coiled or spiral wrapped corrugated filtering medium. The beginning configuration of the corrugated filtering medium 50 is illustrated in FIG. 3A as it is being coiled. Each inside channel 51 is sealed at one end along edge 52 while the opposite end of each channel remains open. The alternating troughs 53 are open along edge 52 while the opposite end of each trough is sealed closed in the coiled configuration along edge 52a. In FIG. 3B the assembled in-line filter 48 is illustrated in greater detail. The air flow pattern is illustrated by the arrows wherein the inlet side of the coiled corrugated filtering medium corresponds to edge 52. The entering air flows into the open face of each trough 53 along edge 52. Since the alternating channels 51 are closed (by sealant or crimping) along edge 52, air is not allowed to flow in. However, along the opposite edge 52a the reverse configuration of what is open and what is closed is present and as indicated is just the opposite from edge 52. Along the opposite edge 52a the troughs are closed and the channels are open. As a consequence, the entering air flow is thereby force to flow through the filtering medium from the troughs to the adjacent channels.

Figure 4:
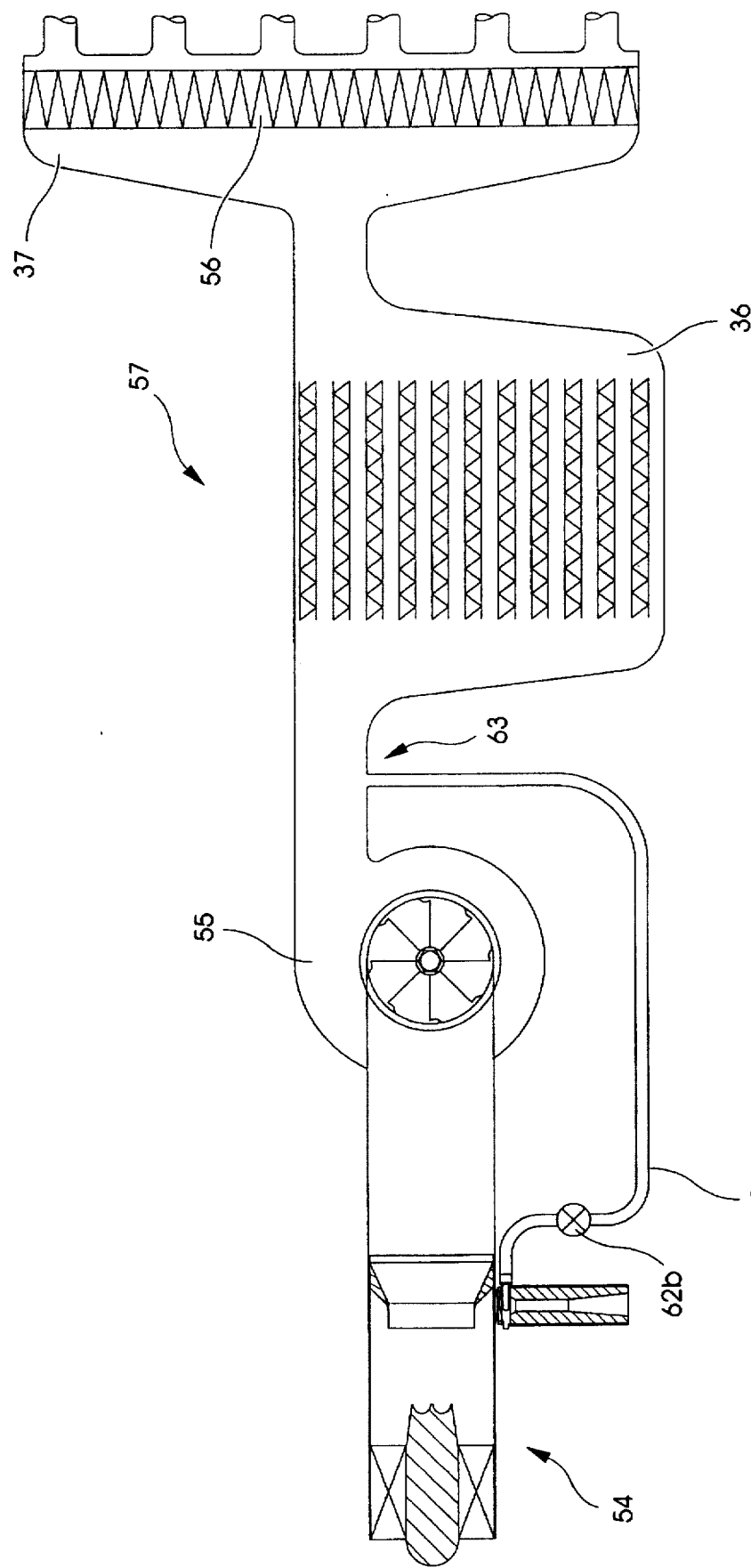
FIG. 4 is a diagrammatic illustration of a pressure side integrated air filter system according to yet another embodiment of the present invention.

Referring to FIG. 4 there is illustrated a pressure side, integrated air filter system 57 according to a still further embodiment of the present invention. In system 57 a precleaner 54 is used upstream from the turbocharger 55. The charge air cooler 36 and intake manifold 37 conform generally with the structure and operation of those same components as illustrated in FIG. 2. An integrated air filter 56 is positioned within the intake manifold 37 as has been described in the context of FIG. 2.

Referring to FIG. 5, the design of precleaner 54 involves the placement of a swirl vane arrangement 58 at the inlet 59 for intake air. Configuration 64 which is attached to precleaner 54 is typically referred to as a pressure ejector nozzle with a venturi. The swirl vane arrangement 58 incorporates 12 vanes each with a 43 degree exit angle. This creates a swirling air flow pattern with a clean air core which is routed through conduit 60 and out through outlet aperture 61 which is in direct flow communication with the inlet to the turbocharger 55 (see FIG. 4). While a specific swirl vane arrangement has been illustrated, a number of variations are possible and have been used successfully.

Line 62, which may be oriented on either side of module 64a, is connected at one end 63 to the downstream side of the turbocharger 55 before the charge air cooler 36 and at the opposite end 62a to venturi module 64a. Line 62 has been placed on the left side of module 64a as opposed to the right side in FIG. 4 simply for drawing clarity. The venturi module in turn is connected to and become a part of the precleaner 54. Approximately one percent of the charge air bleeds off and is routed (by pressure difference) through line 62 to the venturi module 64a so as to create a venturi effect that draws off the larger particulate or "dirty" air which is swirled to and against the inside surface 65 of conduit 66 of precleaner 54. The collected particulate is disposed outside of conduit 60 and downstream from the conduit inlet 67 and thus can be easily drawn off with the venturi module placed at that location. There is also little risk that the separated particulate can reenter the core of clean air due to the continuing swirling air flow.

As illustrated in FIG. 4, a check valve 62b is placed in line 62 between module 64a and end 63. Check valve 62b is provided to prevent backflow during zero boost conditions. A zero boost condition would occur during a downhill run.

Figure 6:
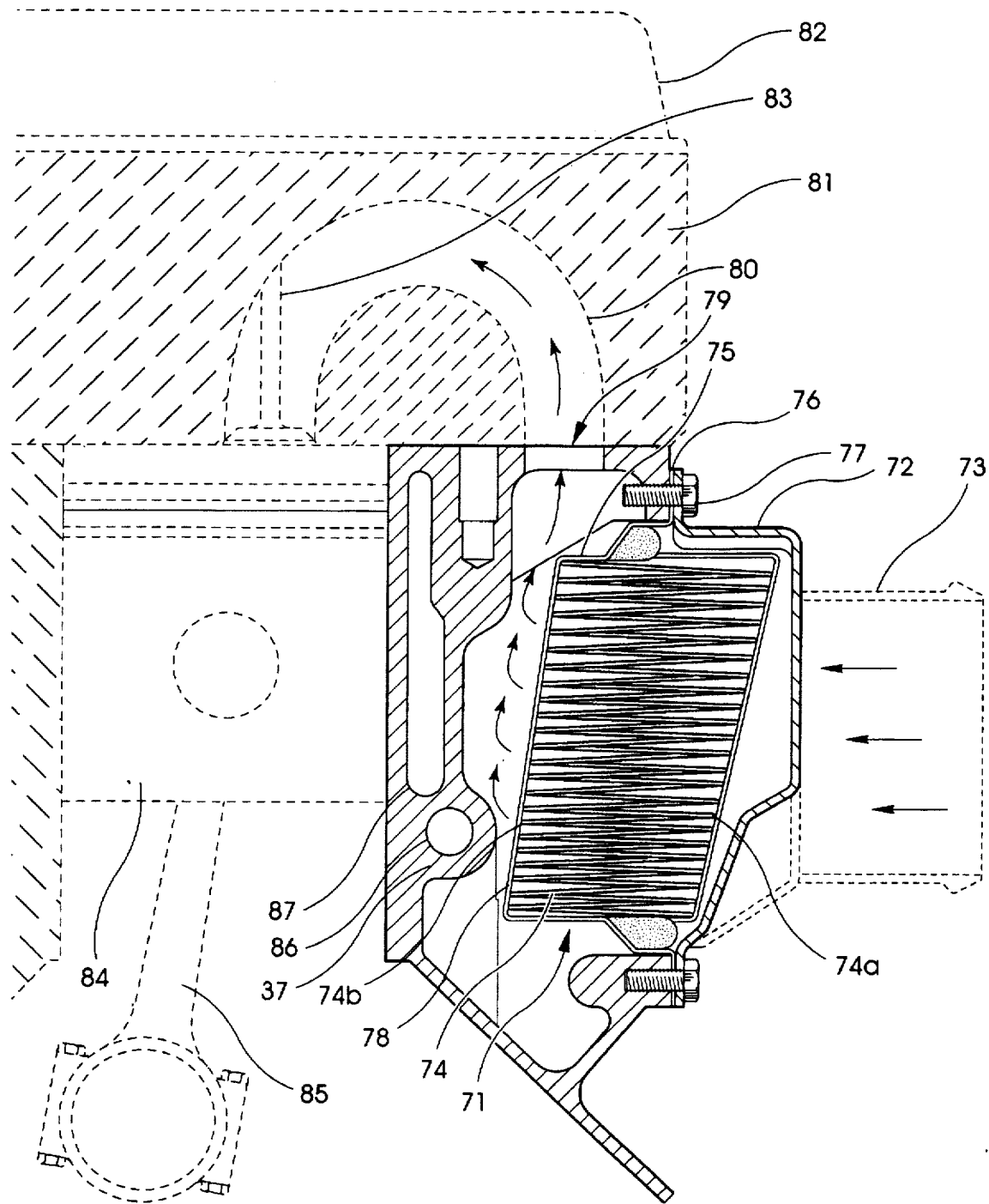
FIG. 6 is a side elevational view in full section of an intake manifold with an installed integrated air filter which may be used as part of the FIG. 2 or FIG. 4 systems.

Referring to FIG. 6, the design of integrated air filter 71 is illustrated. The drawing also includes a diagrammatical illustration of the air flow path through the filter and intake manifold 37. Air filter 71 (represented schematically in FIGS. 2 and 4 as reference items 39 and 56) represents the preferred embodiment of the present invention for the air filter which is to be integrated into the intake manifold. The orientation of FIG. 6 is turned end for end 180 degrees from the left to right flow direction which was used for FIGS. 1 through 4.

The charge air enters the manifold cover 72 via inlet tube 73 (shown in broken line form). Manifold cover 72 doubles as an air filter cover. Filter 71 is mounted and sealed such that the entering air is forced to flow through the fan-folded filtering media 74. Enclosure 75 constitutes a filter carrier and the outer flange 76 is clamped beneath the manifold cover by a series of bold 77 which are threadedly received by the intake manifold. The peripheral flange 76 of the filter carrier (enclosure) replaces the manifold cover gasket.

The air filter 72 as styled and configured in FIG. 6 has a trapezoidal shape (in cross section) as a means to conserve space and to fit within the space which is available within the intake manifold 37. A parallelogram shape could also be used for filter 71. With the illustrated trapezoidal shape (in cross section) the filtering media 74 is a single panel of material which has a first series of folds 74a adjacent cover 72 and an opposite and alternating second series of folds 47b adjacent the rear wall 78 of carrier 75.

The rear wall 78 is open or slotted to enable the filtered air to exit and flow to manifold aperture 79 which coincides with the intake port (passageway 80) disposed in head 81. The head 81, valve cover 82, valve 83, piston 84 and rod 85 are each diagrammatically illustrated in broken line form since their design is not critical and since they do not comprise a part of the new invention. Passageway 86 is the oil rile and passageway 87 is the water jacket.

Figure 7:
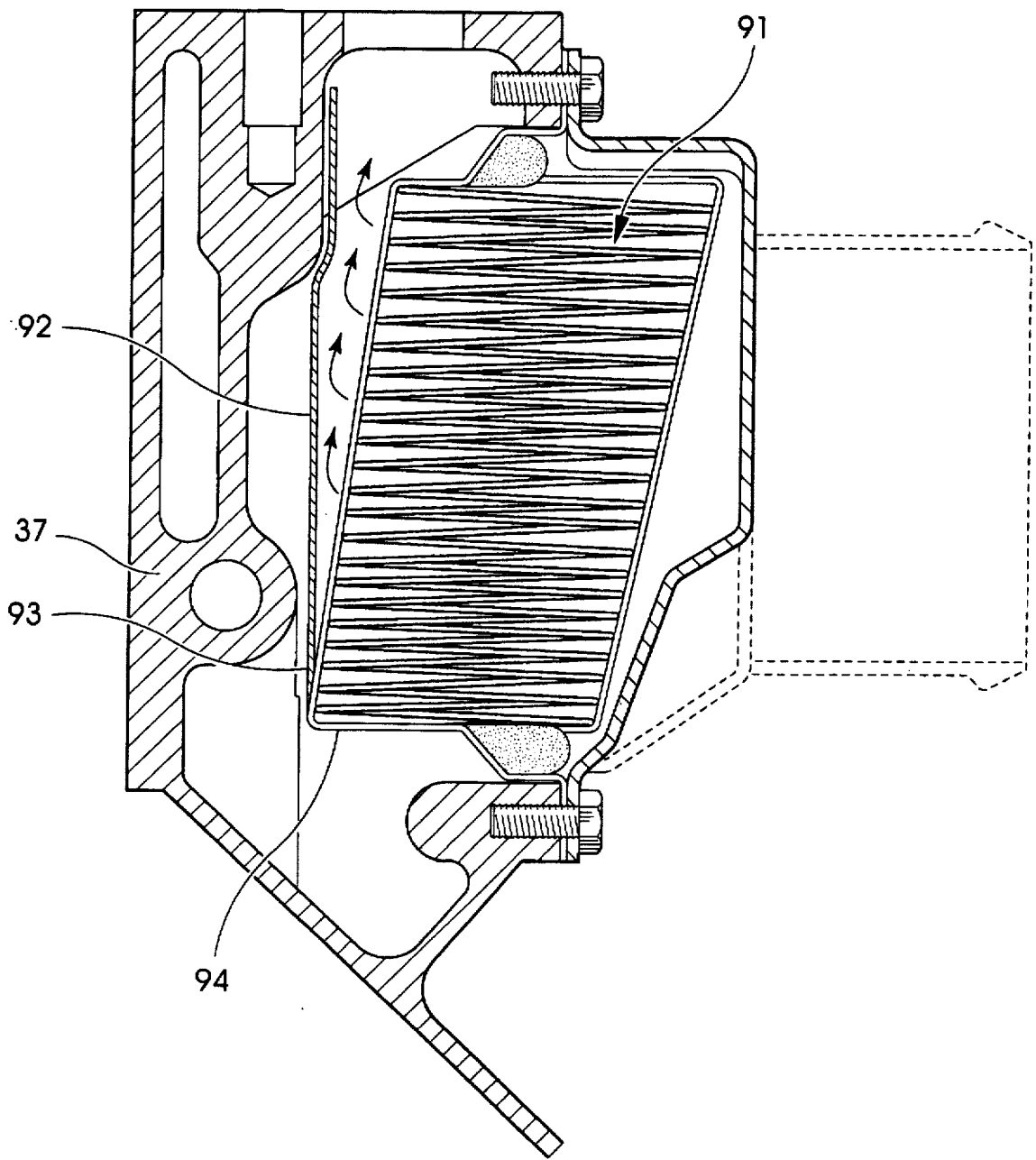
FIG. 7 is a side elevational view in full section of the FIG. 6 intake manifold and filter with the addition of an air deflector/heat shield panel.

One alternative to the design of the FIG. 6 filter 71 and the intake manifold 37 is to provide an air deflector at the rear of the air filter 91 as is illustrated in FIG. 7. As illustrated, this air deflector 92 is integral with an extends up from lower edge 93 of filter carrier (enclosure 94) at an angle so as to not interfere with the flow of filtered air. While deflector 92 directs the exiting air flow in a more vertical path, one of the primary benefits of deflector 92 is as a heat shield. By providing a physical barrier in the manner illustrated by deflector 92, the exiting filtered air remains close to the filter 91 and spaced from the hotter portions of the intake manifold 37. The deflector 92 also serves as a heat shield to help reduce and hopefully preclude any noticeable re-heating of the exiting air as can otherwise occur when the air is allowed to contact the block wall.

One concern to be addressed with any integrated filter design which is installed into an enclosed space is the ease of removal and replacement with a new filter. Can maintenance time be reduced while still keeping the overall packaging concept simple and reliable? Ideally there would be a quick and convenient structural arrangement for opening the filter compartment of the intake manifold and removing the old filter. To this end four different packaging arrangement are illustrated in FIGS. 8 through 11.

Figure 8:
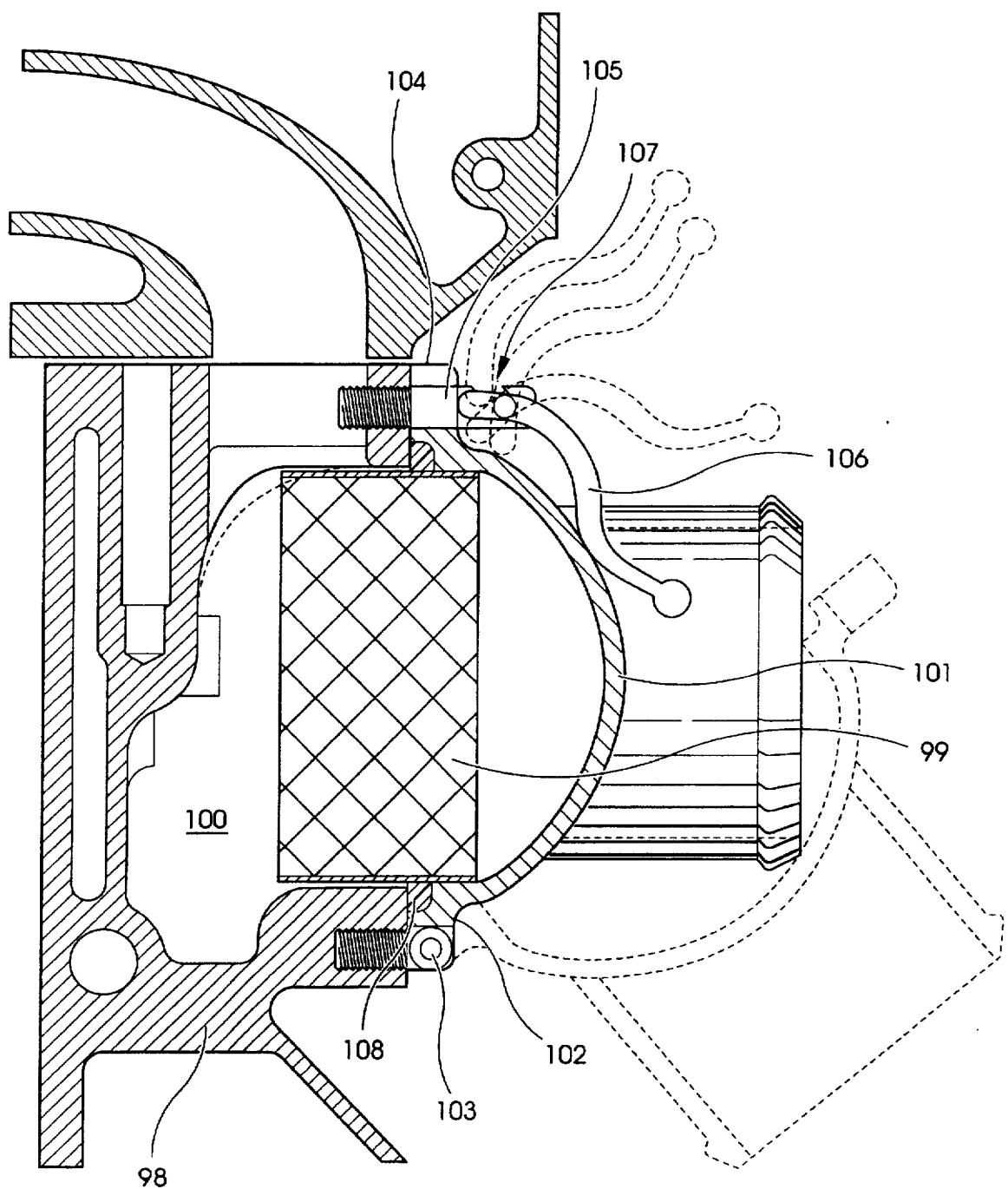
FIG. 8 is a side elevational view in full section of one packaging approach for an integrated air filter which is installed within the intake manifold according to the present invention.

Referring to FIG. 8 part of a typical intake manifold 98 and a representative or generic air filter 99 are illustrated. The filter compartment 100 is enclosed by cover 101. Cover 101 is hinged along one side edge 102 by pin 103. The cover 101 is notched to allow easy assembly of the cover as well as hinged movement.

Along the opposite (upper) edge 104 of the cover a securing stud 105 is used in combination with latch 106. The latch is designed so as to pivot as illustrated in broken line form to a point which is beyond or "over-center" so that it will stay in the stowed position. A notch 107 in stud 105 allows the latch to slide off or out which in turn permits removal of cover 101. A single angular gasket 108 seals both the filter 99 and the cover 101.

Figure 9:
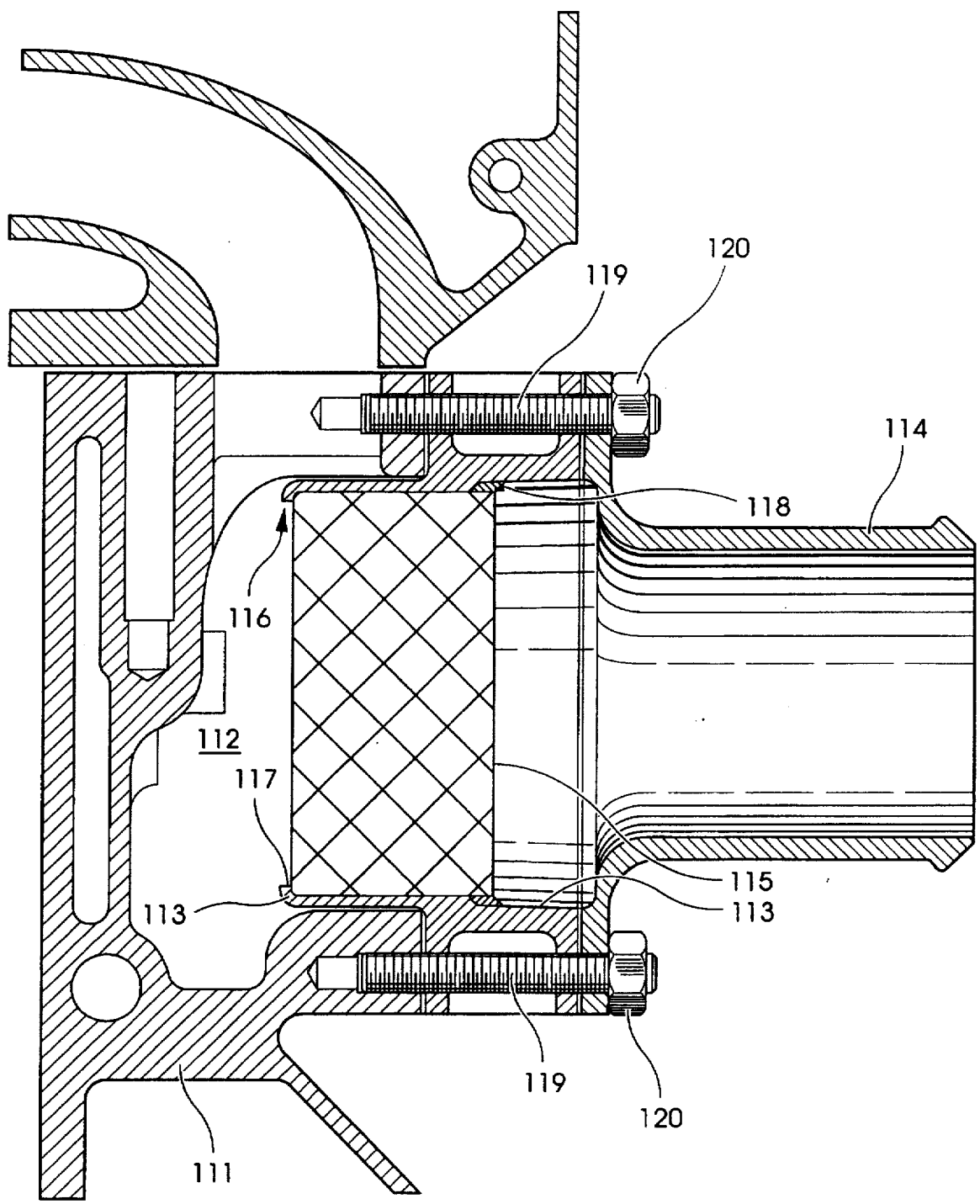
FIG. 9 is a side elevational view in full section of an alternative packaging approach for an integrated air filter according to the present invention.

Referring to FIG. 9 there is illustrated a representative intake manifold 111 which includes a filter compartment 11, a filter carrier 113 and a cover conduit 114. An air filter 115 is assembled into the filter carrier 113 by loading it into the interior-most end 116 of carrier 113 where an inwardly-directed lip 117 is used as an abutment surface for the filter. A silicone adhesive 118 is applied between the outer end of the filter and the carrier 113. The cover conduit is assembled to the carrier an in turn to the intake manifold by a series of threaded studs 119 which are anchored into the intake manifold. These studs provide a simple and quick alignment for the assembled air filter 115 as well as for cover conduit 114. Hex nuts 120 are used to complete the assembly.

Figure 10:
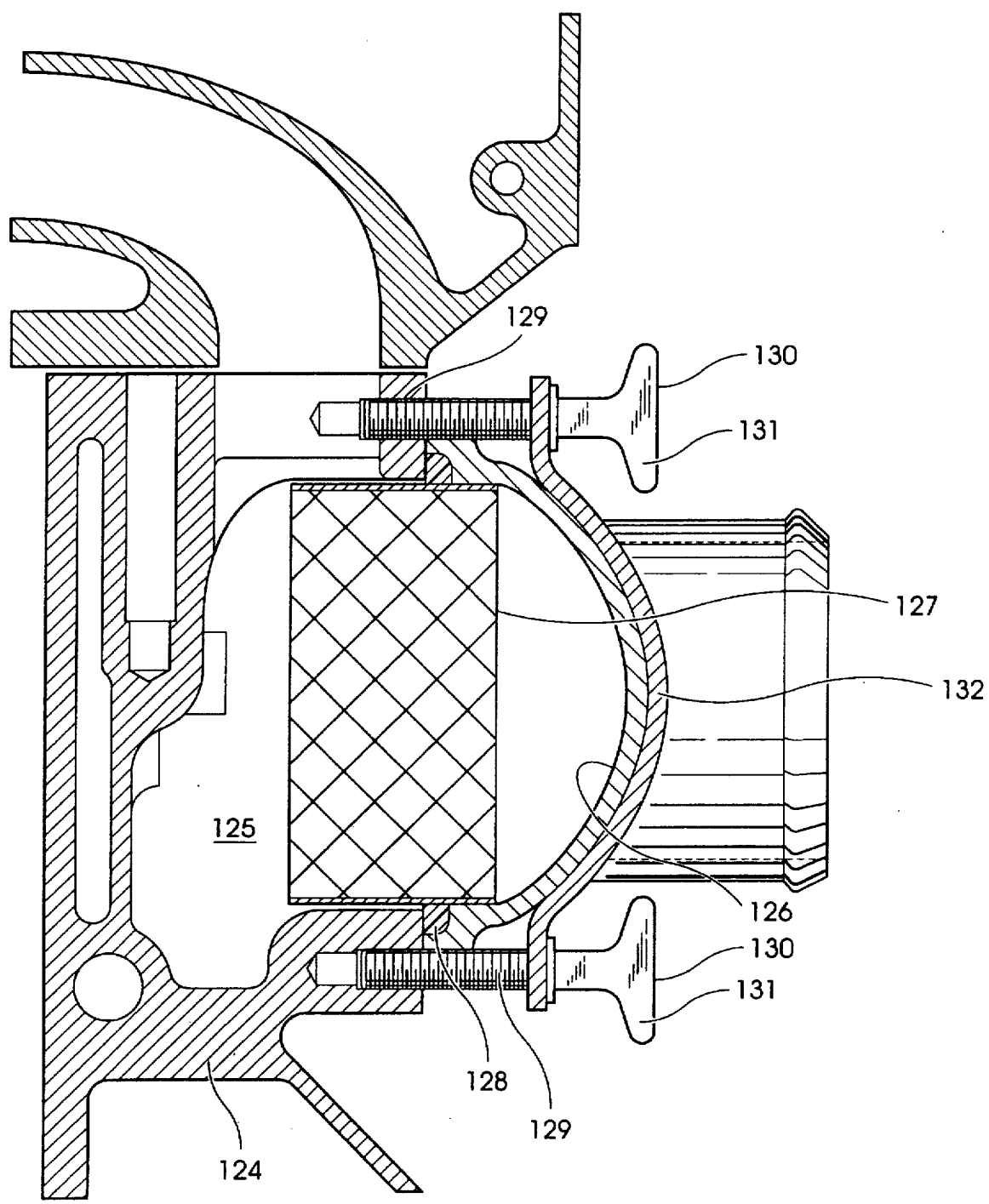
FIG. 10 is a side elevational view in full section of yet a further packaging arrangement for an integrated air filter according to the present invention.

Referring to FIG. 10 there is illustrated a representative intake manifold 124 which includes a filter compartment 125 and cover 126. An air filter 127 is assembled into the filter compartment 125 and an annular gasket 128 is used to establish the seal between the air filter, the intake manifold and the cover.

There are spaced locations in the intake manifold 124 surrounding the air filter 127 which are internally threaded at 129. Corresponding threaded bolts 130, each with an enlarged handle portion 131, extend through bracket 132 and are threaded into the internally threaded holes at 129. As these bolts are tightened the bracket is drawn up against the cover thereby holding the cover and filter in position.

Figure 11:
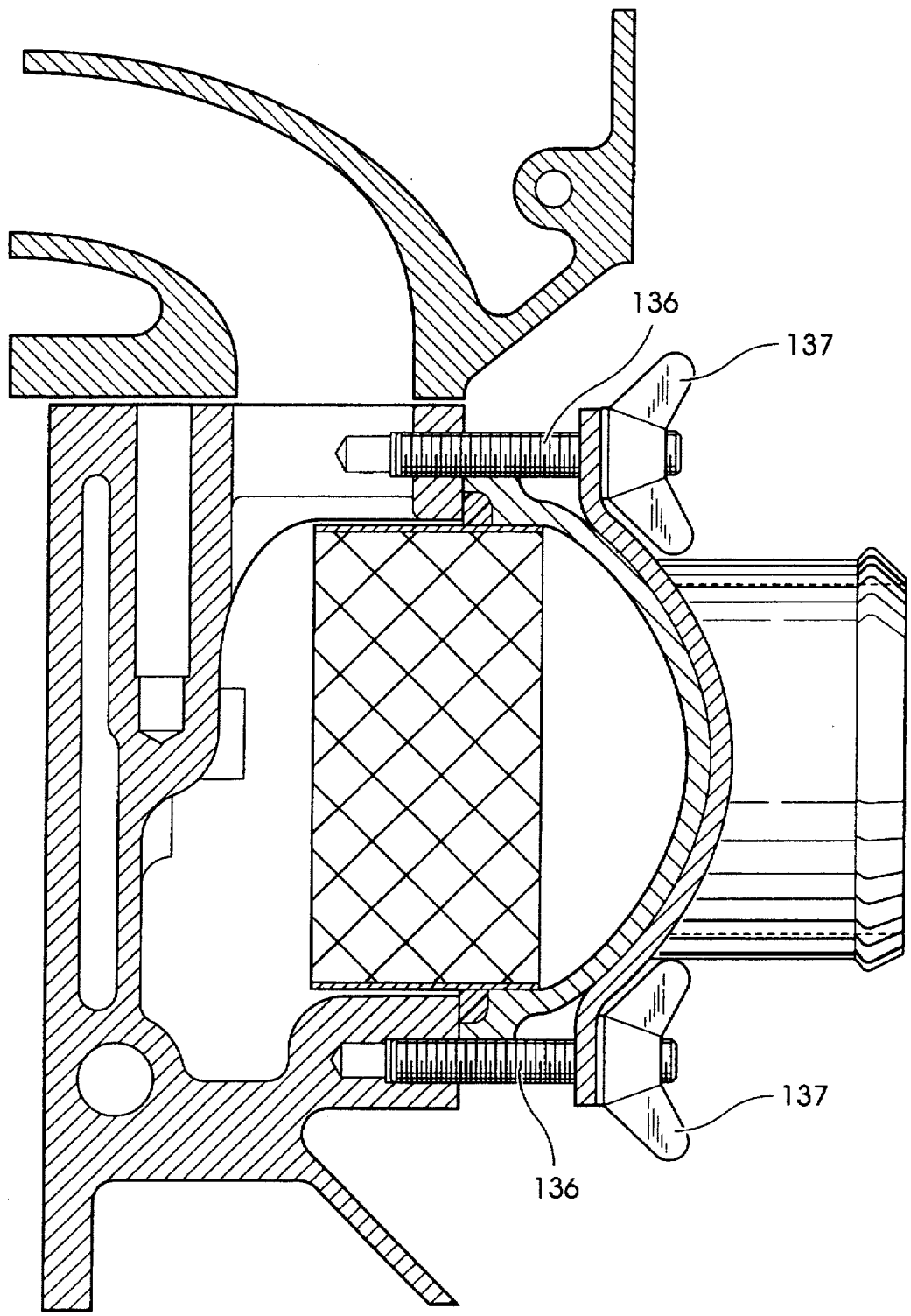
FIG. 11 is a side elevational view in full section of still another packaging arrangement for an integrated air filter according to the present invention.

In the FIG. 11 arrangement the studs 136 are similar to what was illustrated in the FIG. 9 arrangement for studs 119. Wing nuts 137 replace the previously used bolt 130. In virtually all other respects the FIG. 10 and 11 arrangements are the same.

Figure 12:
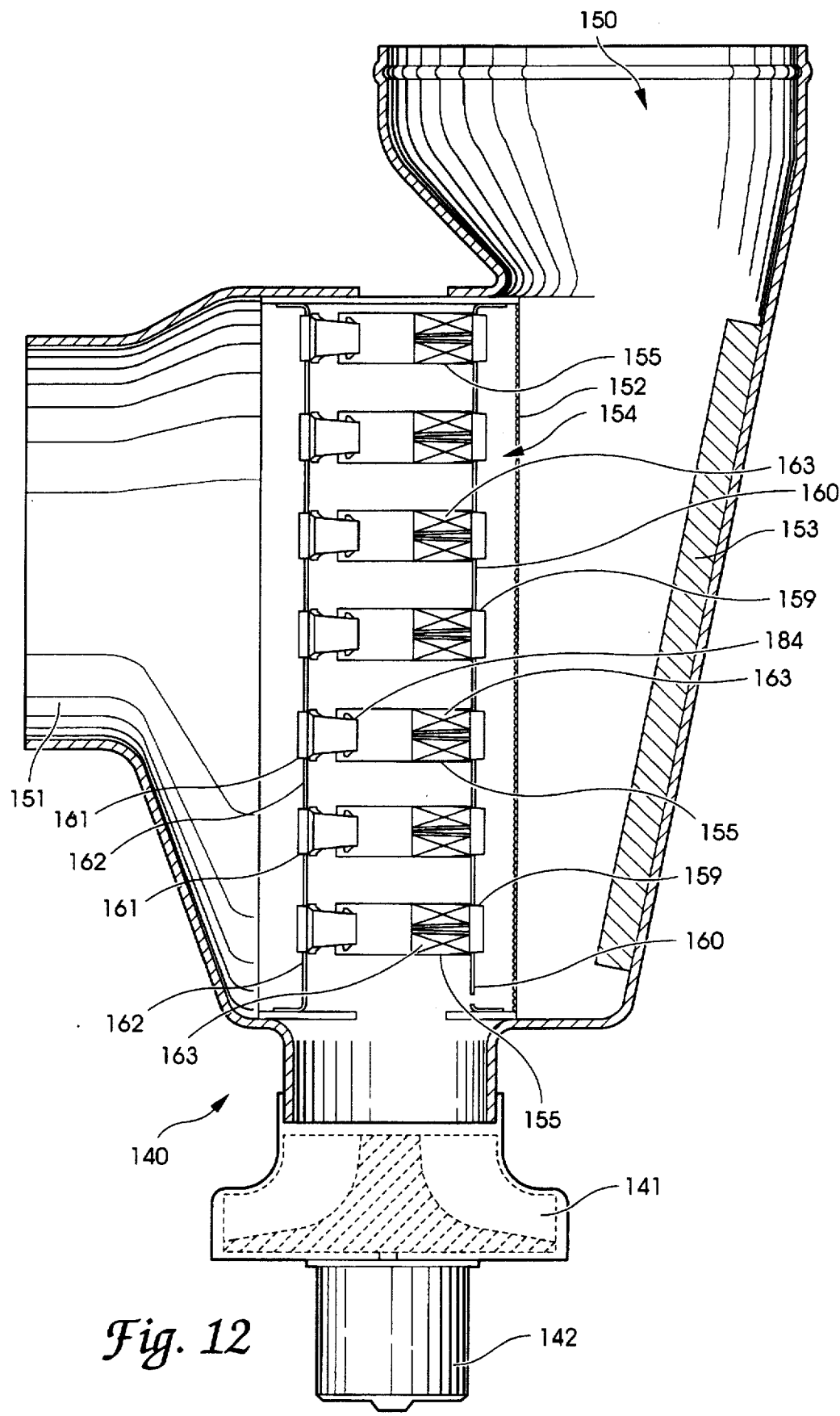
FIG. 12 is a side elevational view in full section of a multi-tube precleaner filter which may be used as part of either the FIG. 2 system or the FIG. 3 system.
Figure 12A:
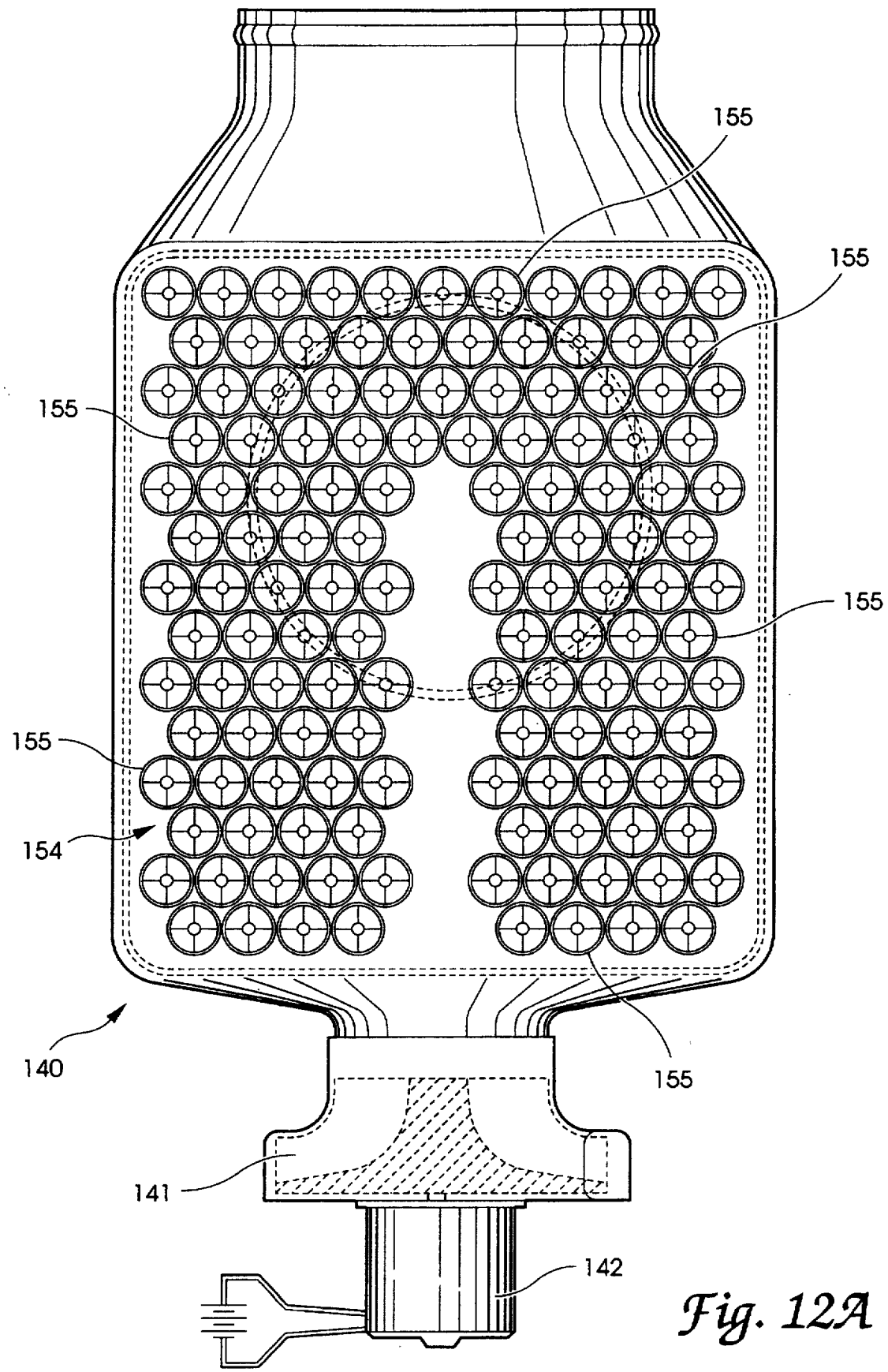
FIG. 12A is a front elevational view of the FIG. 12 precleaner filter with the front wall removed so as to illustrate the individual tubes.
Figure 13:
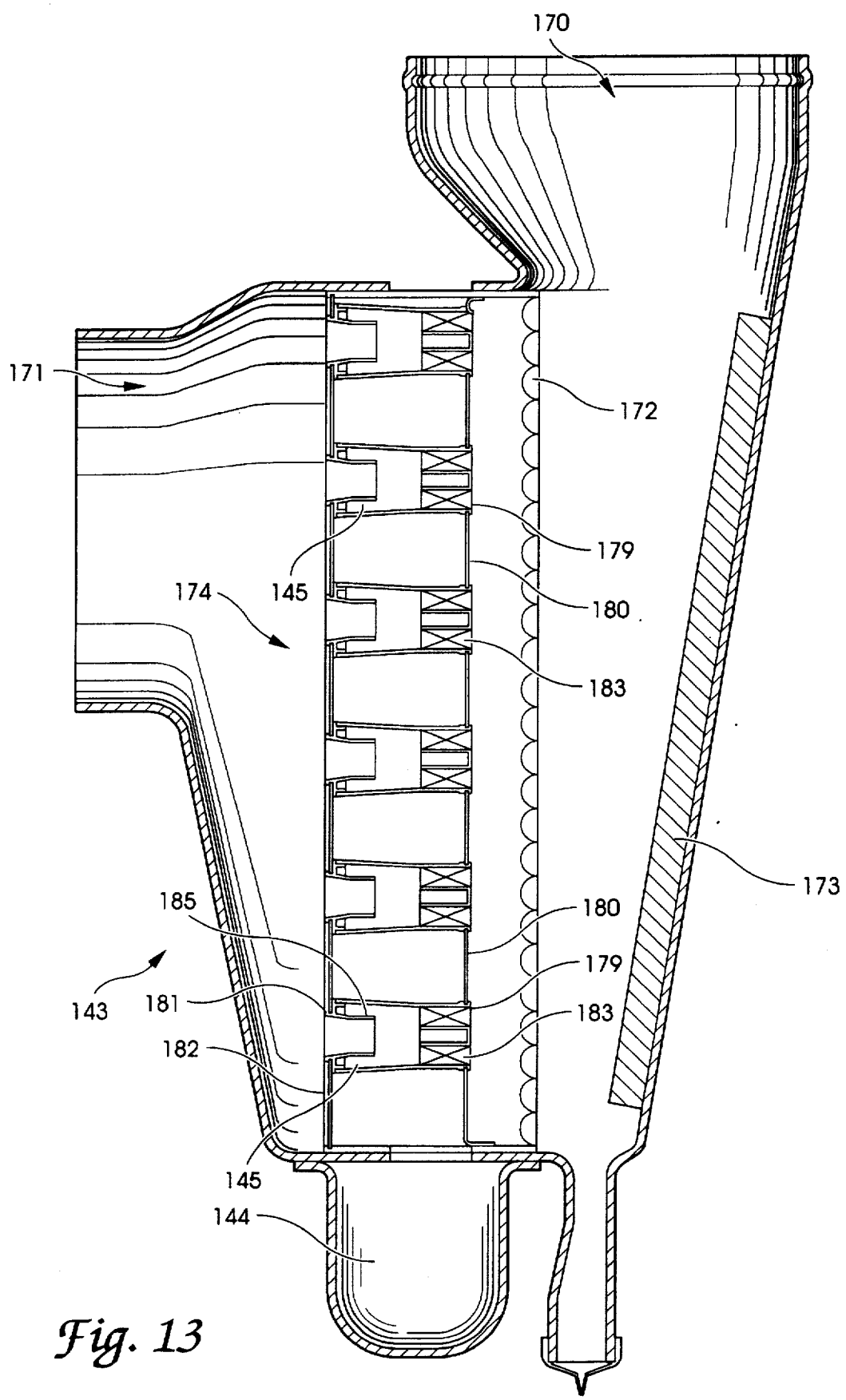
FIG. 13 is a side elevational view in full section of a multi-tube precleaner filter which may be used as part of either the FIG. 2 system for the FIG. 3 system.
Figure 13A:
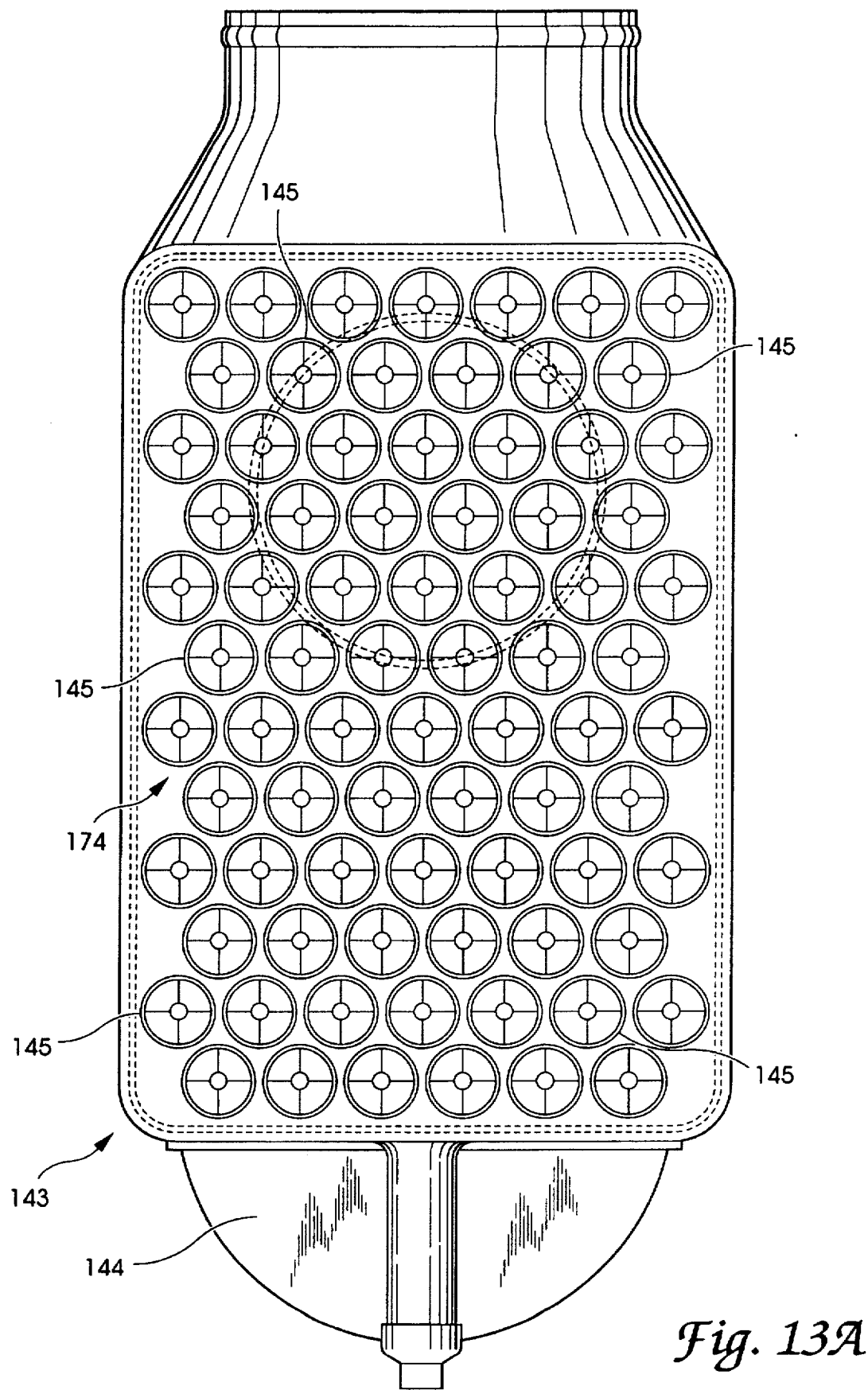
FIG. 13A is a front elevational view of the FIG. 13 precleaner filter with the front wall removed so as to illustrate the individual tubes.

In FIGS. 12 and 12A and in FIGS. 13 and 13A a couple of specific designs are illustrated for a suitable precleaner which may be used in the system configurations of FIGS. 2 and 3. Although similar in a number of respects, precleaner 140 as illustrated in FIGS. 12 and 12A includes a scavenger blower 141 which is driven by a 12 volt DC motor 142. In contrast, precleaner 143 as illustrated in FIGS. 13 and 13A includes a sealed dust bin 144 disposed below the array of vortex tubes 145.

With reference more specifically to FIGS. 12 and 12A, precleaner 14 includes an inlet 150, outlet 151, water separation/flow distribution screen 152 and a panel of acoustical foam 153 which is bonded to the outer wall of the precleaner. Disposed between inlet 150 and outlet 151 and above the scavenger blower 141 is an array 154 of evenly spaced, vortex tubes 155. A total of 132 vortex tubes 155 are positioned in the array 154 and each vortex tube has a first end 159 mounted into inlet plate 160 and an opposite, second end 161 mounted into outlet plate 162. The actual number of vortexing tubes 155 will vary with engine size.

With reference more specifically to FIGS. 13 and 13A, precleaner 143 includes an inlet 170, outlet 171, water separation/flow distribution screen 172 and a panel of acoustical foam 173 bonded to the inside surface of the outer wall of the precleaner. Disposed between the inlet 170 and outlet 171 above the dust bin 144 is an array 174 of evenly spaced, vortex tubes 145. A total of 78 vortex tubes 145 are positioned in the array 174 and each tube has a first end 179 mounted into inlet plate 180 and an opposite, second end 181 mounted into outlet plate 182. Here again, the actual number of vortex tubes 145 will vary with engine size.

Vortex tubes 155 and 145 are each variations of a basic vortex tube inertial separator. Such vortex tubes rely strictly on inertial separation of particulate in a spinning (vortex) flowstream of gas. The two different designs are really not much different (other than in size) from the "single-tube" precleaner shown in FIG. 6. The gas enters the front end of the tube and encounters the helical swirl vanes, item 163 in FIGS. 12 and 12A and item 183 in FIGS. 13 and 13A, which impart a swirl to the gas flow. The particles then migrate toward the wall and are exhausted through a dust outlet slot or port cut in the tube wall. The particle depleted core of swirling air is stripped off by the smaller concentric diameter sleeve within the tube body. The smaller concentric diameter sleeve is item 184 in FIGS. 12 and item 185 in FIGS. 13.

The basic difference between the two vortex tube designs is primarily diameter, but there are some additional subtle design differences such a the slightly flared body of the vortex tubes shown in FIG. 13. The operation of the larger slightly flared design of FIG. 13 has better performance when zero scavenge flow is used as with a sealed dust bin.

The primary advantage of the multi-tube design (array) over the single-tube design shown in FIG. 5 is of increased separation efficiency. For a given vortex tube air inlet velocity (and corresponding restriction), the inertial separative force on the particles is inversely proportional to the tube radius. Therefore, using many small tubes rather than one large tube yields higher efficiency and better protection for the turbocharger as well as longer air filter life.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A pressure side integrated air filter assembly for a turbocharged engine which includes an intake manifold, said integrated air filter assembly comprising:

an air filter carrier designed and arranged to mount to said intake manifold, a portion of said air filter carrier being disposed within said intake manifold and said air filter carrier including an exit aperture for the exit flow of filtered air;

an air filter element having an inlet side and an outlet side and being loaded into said air filter carrier and positioned across said exit aperture; and an air filter cover designed and arranged to mount to said intake manifold over said air filter element, said air filter cover having an air inlet aperture to introduce air to said air filter element.

2. The air filter assembly of claim 1 wherein said air filter carrier includes a peripheral flange which is designed and arranged to be clamped between said air filter cover and said intake manifold for support of said air filter assembly.

3. The air filter assembly of claim 2 wherein said air filter element is configured with a trapezoidal shape in cross section.

4. The air filter assembly of claim 3 wherein said air filter element is a single panel of filtering media which is fan-folded with a first series of folds and an alternating second series of folds such that the folds of said first series are generally disposed adjacent the air filter cover at the inlet side of said air filter element and the folds of said alternating second series are generally disposed adjacent said air filter carrier at the outlet side of said air filter element.

5. The air filter assembly of claim 4 which further includes a deflector plate dispelled adjacent the exit aperture of said air filter carrier such that exiting air flow from said air filter element strikes said deflector plate.

6. The air filter assembly of claim 1 which further includes a deflector plate disposed adjacent the exit aperture of said air filter carrier such that exiting air flow from said air filter element strikes said deflector plate.

7. The air filter assembly of claim 1 wherein said air filter element is a single panel of filtering media which is fan-folded with a first series of folds and an alternating second series of folds such that the folds of said first series are generally disposed adjacent the air filter cover at the inlet side of said air filter element and the folds of said alternating second series are generally disposed adjacent said air filter carrier at the outlet side of said air filter element.

8. The air filter assembly of claim 1 which further includes a hinge pin for pivotally securing one portion of said filter cover to said intake manifold.

9. The air filter assembly of claim 8 which further includes a pivotable latch and securing stud assembly for opening and closing said air filter cover.

10. In combination:
   a turbocharger internal combustion engine having a turbocharger and an intake manifold disposed in air flow communication with said turbocharger;
   a precleaner air filter positioned upstream from said turbocharger and disposed in air flow communication therewith; and
   a pressure side air filter assembly disposed within said intake manifold and enclosed by an intake manifold cover, wherein said pressure side air filter assembly includes
      (a) an air filter carrier designed and arranged to mount to said intake manifold, a portion of said air filter carrier being disposed within said intake manifold, and
      (b) an air filter element having an inlet side and an outlet side and being loaded into said air filter carrier and positioned across an exit aperture of said filter carrier.

11. The combination of claim 10 wherein said air filter carrier includes a peripheral flange which is designed and arranged to be clamped between said intake manifold cover and said intake manifold for support of said air filter assembly.

12. The combination of claim 10 wherein said air filter element is a single panel of filtering media which is fan-folded with a first series of folds and an alternating second series of folds such that the folds of said first series are generally disposed adjacent the intake manifold cover at the inlet side of said air filter element and the folds of said alternating second series are generally disposed adjacent said air filter carrier at the outlet side of said air filter element.

13. The combination of claim 12 which further includes a deflector plate disposed adjacent the exit aperture of said air filter carrier such that exiting air flow from said air filter element strikes said deflector plate.

14. The combination of claim 10 which further includes a charge air cooler positioned between and in air flow communication with said turbocharger and said intake manifold.

15. The combination of claim 10 wherein said precleaner air filter includes a plurality of vortex tubes arranged into an array.

16. The combination of claim 15 wherein said precleaner air filter further includes a scavenger blower disposed at one end of said array.

17. The combination of claim 15 wherein said precleaner air filter further includes a dust bin disposed at one end of said array.

18. The combination of claim 15 wherein said precleaner air filter further includes a pressure ejector nozzle with a venturi.

* * * * *

UNITED STATES PATENT AND TRADEMARK OFFICE
CERTIFICATE OF CORRECTION

PATENT NO. : 5,472,463

DATED : December 5, 1995

INVENTOR(S) : Peter K. Herman, et al.

It is certified that error appears in the above-identified patent and that said Letters Patent is hereby corrected as shown below:

In Col. 1, at line 25, replace "service" with --serviced--.

In Col. 2, at line 3, before the word "filter", replace "with" with --this--.

In Col. 2, at line 24, replace "as" with --at--.

In Col. 3, at line 58, replace "for" with --or--.

In Col. 4, at line 43, replace "for" with --or--.

In Col. 5, at line 49, replace "become" with --becomes--.

In Col. 6, at line 15, replace "bold" with --bolts--.

In Col 6, at line 18, replace "72" with --71--.

In Col. 6, at line 34, replace "rile" with --rifle--.

UNITED STATES PATENT AND TRADEMARK OFFICE
CERTIFICATE OF CORRECTION

PATENT NO. : 5,472,463

DATED : December 5, 1995

INVENTOR(S) : Peter K. Herman, et al.

It is certified that error appears in the above-identified patent and that said Letters Patent is hereby corrected as shown below:

In Col. 6, at line 38, replace "an" with --and--.

In Col. 6, at line 57, replace "arrangement" with --arrangements--.

In Col. 7, at line 8, replace "11" with --112--.

In Col. 7, at line 15, replace "an" with --and--.

In Col. 9, at line 4, replace "dispelled" with --disposed--.

Signed and Sealed this

Tenth Day of December, 1996

Attest:

BRUCE LEHMAN

Attesting Officer

Commissioner of Patents and Trademarks